March 12, 1940.  J. N. ICE  2,192,914
METHOD OF CONNECTING CONDUIT SECTIONS
Filed Nov. 30, 1938
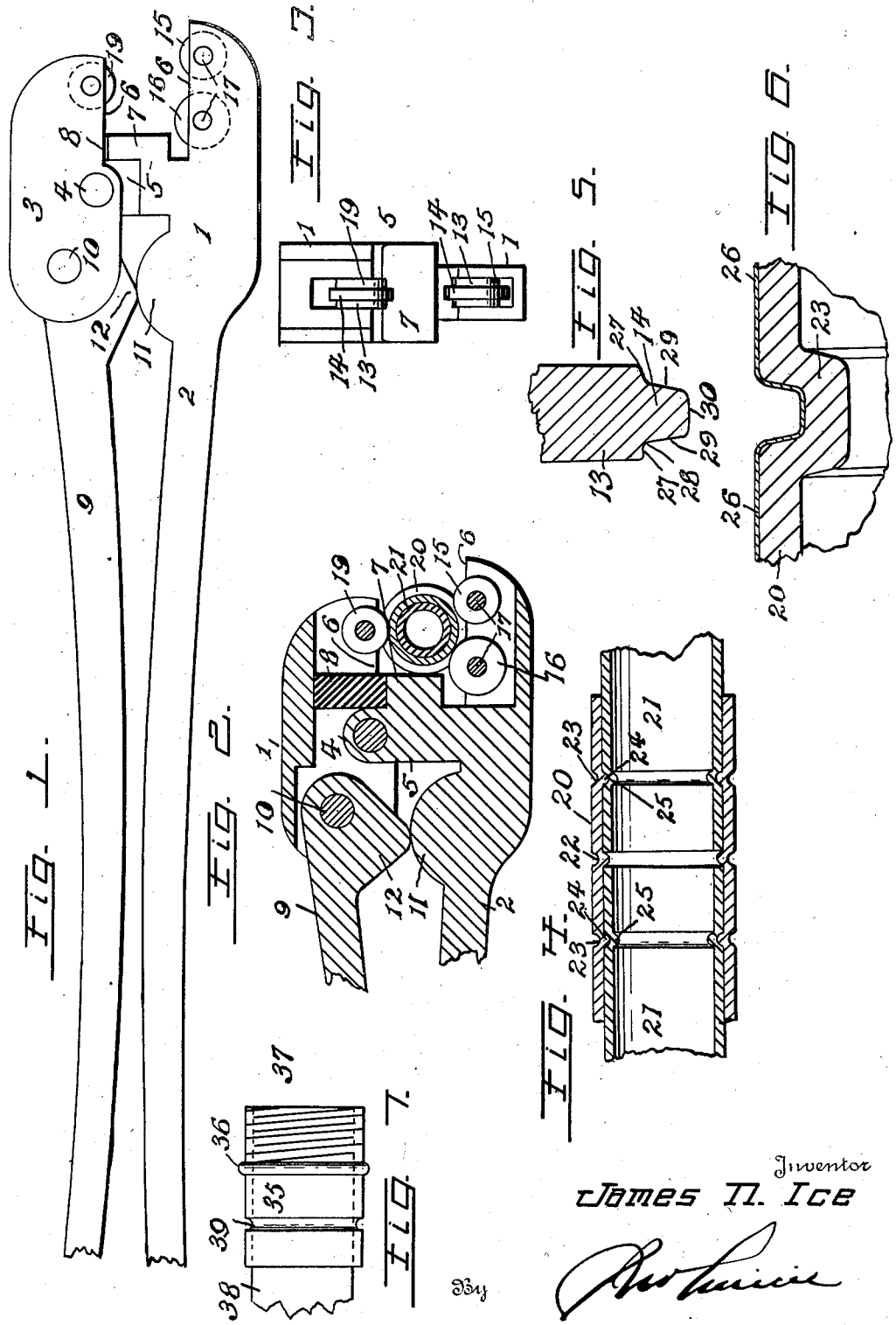
Inventor
James N. Ice Patented Mar. 12, 1940

2,192,914

UNITED STATES PATENT OFFICE 2,192,914

METHOD OF CONNECTING CONDUIT SECTIONS

James N. Ice, Wheeling, W. Va., assignor to a trusteeship composed of himself, Alexander Best, and Samuel K. Frank, all of Wheeling, W. Va., as trustees Application November 30, 1938, Serial No. 243,257

3 Claims. (Cl. 29—157)

This invention relates to a method of and means for permanently connecting the meeting ends of conduit pipe sections, particularly though not necessarily electrical conduits, where such permanent connection also provides an all-metal seal for the conduit sections.

The primary object of the present invention is to utilize a coupling involving a short section of tubing, preferably though not necessarily similar to that of the tubing sections to be joined, which coupling bridges the meeting ends of the sections to be joined and extends beyond such meeting ends in both directions, together with means by which the coupling is circumferentially indented or depressed throughout an annular path, with the metal of this depressed path extending inwardly of the inner surface of the coupling and correspondingly indenting the exterior surfaces of the tube or conduit sections to form a sealing interlock preventing relative endwise movement of the coupled conduit sections and sealing the meeting ends of the sections against the possibility of moisture or fluid passing the interlocking depression.

It will, of course, be understood that the sections of electrical conduit are coupled "on the job," that is where the electrical installation is being made, and may be cut by the workman where necessary in appropriate lengths to meet the demands of the installation. The conduit sections, generally of a standard length, and the couplings are delivered on the job and connected up or coupled as the necessities of the installation demand. Practically in all large electrical installations of this type, and particularly where the floors of the building are of concrete or the like, the conduit installation is embedded in this concrete mass and forms, of course, an open runway through which the necessary wires may be fed in the usual manner. Even when not so embedded, the conduit is generally within the wall or ceiling or floor, concealed from the eye, and ordinarily inaccessible after completion of the building except after breaking away external parts to expose the conduit.

It is of extreme importance that the external portion of the conduit and of the coupling be protected against moisture or the elements of the air in order to prevent deterioration through rust or the like. If not so protected, the conduit and coupling, responding to the action of the rust, would have a very short life and when broken through such action, the enclosed wires are open to the admission of moisture or the like and, are soon shorted. This has been so recognized by the trade that the conduit sections and also the couplings are protected by a thin galvanizing layer usually electrically deposited and serving, as is well understood, to prevent the parts being subjected to deterioration as above referred to.

Of course, it is imperative that in any action or any method by which the meeting ends of the conduit sections are connected, there must be no breakage in the galvanize coating. If, during the connection of the coupling unit, the galvanize coating is broken, the protective effect of this coating is destroyed throughout the extent of the break and the metal proper of the coupling or conduit is exposed to the action of moisture or the like with the result that rust very quickly destroys the efficiency of the conduit.

It is, therefore, imperative that any means utilized in interlocking the coupling and conduit sections must be of such a nature and so employed as to avoid any possibility of breaking the galvanize coating, so that the surface operated upon by the connecting means is just as completely and effectively protected after the connection is made as before. As the coupling is the only element operated upon and as it, of course is galvanized as is the conduit, it will be apparent that the means for providing the connection and seal must avoid the breaking of the galvanize coating of the coupling.

Therefore, the primary object of the present invention is the provision of a method of uniting the coupling and adjacent conduit sections with a positive all-metal seal interlock, the treatment of the coupling to provide this positive all-metal seal interlock being particularly designed with a view to avoiding any possible break in the galvanize coating of the coupling.

A further object of the invention is the provision of an element in the form of a hand tool by which the coupling is readily and conveniently formed with an annular depression which displaces the metal of the coupling throughout the area of the depression, forming on the inner surface of the coupling an annular projection which is itself forced into and forms an annular depression in the immediately underlying conduit section. As the formation described results from a single operation of the element, it is, of course, at once apparent that the projection on the inner surface of the coupling is the sole means by which the receptive depression in the outer surface of the conduit section is formed and hence there is such an intimate and exact fit between this projected area on the coupling and in the conduit that there is thereby provided an absolutely complete seal against the passage of moisture, water or the like.

The invention is illustrated in the accompanying drawing, in which:

Figure 1 is a view in side elevation of the improved tool.

Figure 2 is a broken longitudinal section of the same with a coupling and conduit section shown in position between the jaws and in section.

Figure 3 is an end view of the jaws.

Figure 4 is a longitudinal section showing the coupling and conduit sections following the completion of the operation.

Figure 5 is an enlarged broken view of one of the forming rollers.

Figure 6 is an enlarged broken view of a coupling section illustrating the formation of the depression while maintaining the galvanize coating intact.

Figure 7 is a view in elevation showing the improvement applied to a box connector.

As it is necessary to understand the mechanical operation in order to gain a comprehensive idea of the method, the tool or implement will be first described. The tool or implement by which the mechanical operation is carried out comprises a fixed jaw 1 from which rigidly extends a preferably integral handle 2 and a movable jaw 3 arranged to cooperate with the fixed jaw and pivotally supported at 4 on a lateral extension 5 of the fixed jaw. The relation of the jaws 1 and 3 is such that their relatively inner and adjacent faces 6 present flat, plane surfaces which, when the jaws are in operative relation, are parallel.

As will later appear, the coupling with the contained meeting ends of the conduit sections is interposed between the jaws for operation and a block 7 is secured to or forms part of the extension 5, the face of which block is at right angles to the proximate faces of the jaws and provides a stop or limit in the placing of the coupling between the jaws. A resilient block 8 is inserted and held in a recess in the movable jaw in line with and bears against the adjacent end of the block 7. As will later appear, when the jaws are in operative relation, the resilient block 8 is compressed and acts to provide a means whereby the movable jaw is moved relative to and away from the fixed jaw when the operative pressure is released, thus insuring the normal open relation of the jaws to permit the convenient introduction of the coupling.

A handle 9 for the movable jaw is pivotally connected to the movable jaw at 10, the handle fitting in the recess or channel or between the plates of which the movable jaw may be constructed. On the adjacent faces of the handles 2 and 9 immediately in rear of the jaw formation are offset cam sections 11 and 12 so formed and related that when the free ends of the handles are moved toward each other, the cam 12 on the movable jaw handle 9 will ride up upon and reach the peak or highest point of the cam 11 on the fixed jaw handle 2. This will, of course, elevate the pivot 10 and force the rear end of the movable jaw upwardly and the forward or operative end downwardly, that is toward the fixed jaw, to permit the desired operation.

The provision of the cam elements and their relation to the jaws insures an easy relative action of the jaws in the movement of the handles and very materially increases any handle pressure in its application to the movable jaw. Furthermore, these cams, when in operative relation, form in effect a more or less friction lock to hold the movable jaw in its relative position during operation of the tool or implement and thus permit the operation to be carried out without the exercise of any very material manual force on the handles 2 and 9 to either operate the movable jaw or hold it in operative position.

The operative faces 6 of the jaws in advance of the block 7 are channeled to provide in effect spaced plate formation between which the operating rollers are mounted. These rollers, which are of a particular and peculiar formation to be later described in connection with the method, comprise a hub-like section 13 and an annular projecting rib-like formation 14 projecting beyond the periphery of the hub-like section and constituting the creasing or offset element of the roller. Two such rollers 15 and 16 are mounted in the lower or fixed jaw. These rollers are supported on pintles or shafts 17 passing through the plate-like members between which the rollers are supported, the shafts passing through the hub-like sections 13 and providing for free rotation of the rollers.

The roller 15 is mounted adjacent the free end of the fixed jaw while the roller 16 is mounted in spaced relation to the roller 15 and toward the rear of the fixed jaw. For purposes which will later appear, the roller 16 is slightly increased in diameter with respect to the roller 15. A roller 19 is similarly mounted in the movable jaw, this roller 19 corresponding in size to the roller 15 and being arranged in a position substantially between the operative planes of the rollers 15 and 16; that is, a line passing through the mounting of roller 19 at right angles to the operative faces 6 of the jaws would be substantially between similar lines extending from the mountings of the rollers 15 and 16.

Preferably, the handles 2 and 9 may curve outwardly toward their free ends to facilitate grasping and operating. It is, of course, to be understood that the leverage in part of the cam actions is sufficient to insure the operation of the rollers to be described and that the frictional hold afforded by the cams when the jaws are in operative relation is also insured.

In the use of the tool or implement, the coupling, indicated at 20, receives the meeting ends of the conduit sections 21, there being preferably a slight internal rib 22 in the coupling to form a limit for the insertion of the ends of the conduit sections and thus insure that the adjacent or substantially meeting ends of these sections are about centrally of the length of the coupling. The coupling and conduit sections will then be operated on by the tool or implement described. For this purpose the coupling is introduced between the jaws 1 and 3 when open and is then fixed against rotation, preferably by being held by another pincer-like element which will grip the coupling and prevent its movement during operation of the tool or implement.

The handles 2 and 9 are then compressed, that is moved toward each other, and the cam action forces the movable jaw toward the fixed jaw. This pressure causes the rollers, and particularly the roller on the movable jaw, to depress the metal of the coupling and the tool or implement is then turned circumferentially about the coupling in a plane at right angles to the axis of the coupling to thereby form a depression 23 in the outer surface of the coupling, which depression, due to the full rotation of the tool or implement, is of completely uninterrupted annular form. The metal depressed in the outer surface of the coupling is, of course, not cut away but merely depressed and correspondingly offset at 24 from the inner surface of the coupling and by this offset the outer surface of the immediately underlying conduit section is formed with a receptive depression 25 into which the offset 24 naturally fits so snugly as to form a seal. The cooperation of the offset 24 and the depression 25 forms a lock which prevents endwise relative movement of the coupling and conduit sections and thus in a single operation of the tool or implement there is formed a complete interlock and metallic seal between the coupling and conduit sections.

The provision of the roller 16 as of slightly increased radius over the rollers 15 and 19 is desirable in order to provide for convenient rotation of the tool. If the rollers 15 and 19 are depressing the metal in the outer surface of the coupling, the tool or implement is guided in proper lines while the roller 16 of slightly increased diameter will insure a depression of the proper depth without the necessity and extra labor of completely forming the depression of this depth by the rollers 15 and 19. In other words, the formation of the depression to the proper depth is the final function of the roller 16, the initial formation of the depression and a corresponding guiding function being provided by the rollers 15 and 19.

Of course, the tool or implement will be operated on each side of the rib-like section 22, so that both sections of the conduit will be interlocked and sealed with respect to the coupling. In other words, the sealing interlock will be formed in the coupling on each side of the rib 22 to thereby seal and interlock the immediately underlying conduit section. Whenever desired, and particularly where necessary, two or more operations of the tool or implement may be performed on each side of the rib 22, thus doubly insuring the interlocking seal.

The method involved is of the utmost importance, for while many attempts have been made to interlock couplings of this type with a safe and sure interlocking and sealing, practically all such are virtually defective in that they expose the connection, and particularly the exterior of the coupling, to the action of moisture and the elements, with the result of permitting the accumulation of metal-destroying rust. As previously stated, the conduit sections and couplings are galvanized to protect them against this rust deterioration, and it follows as a matter of course that if this galvanize coating is broken or interrupted, exposure to rust is obvious and the life of the connection is so materially shortened and so much labor and cost-consuming time is necessary to replace the damage, that such rust admitting connections are commercially impracticable.

Where the type of coupling is that of a simple sleeve-like formation, which from the standpoint of initial cost and economy in installation is desirable, the means for uniting or interlocking the coupling and conduit sections must be such as to absolutely avoid breaking the galvanize coating of the coupling. Of course, these defects do not exist where the coupling is of a type to be threaded in place or to be welded in place, but these operations are matters of time-consuming labor in connection with the welding operation and rather imperfect sealing relations added to materially increased cost of the coupling and necessary threading of the conduit section ends where the threading operation is contemplated. The obvious objections to these particularly described methods of connecting the coupling and conduit sections have constituted a long-felt want in this industry and many attempts have been made to provide for an interlocking and sealing means, other than those described, but in every such instance known the galvanize coating has always been interrupted in the formation of the interlock and to this extent all such previous means within the knowledge of the applicant are commercially of little value.

Applicant, therefore, provides a simple, positive form of interlock and seal resulting from the operation of the tool or implement previously described and which, by reason of the peculiar formation of the operating parts, provides the interlocking depression without in any way interrupting, breaking or marring the galvanize coating of the coupling or of the conduit sections.

This method will be plainly apparent from Figures 5 and 6 in which the forming roller and a section of the coupling are shown on an enlarged scale in order that the formation necessary to carry out the method may be plainly seen.

In these Figures 5 and 6, the parts are materially enlarged and exaggerated in order that the method may be plainly understood. In the first place and as previously stated, the exterior surfaces of the coupling 20 and of the conduit sections 21 are exteriorly galvanized for usual protective purposes. The galvanize coating for the coupling 20 is indicated at 26. The juncture of the rib 14 and of the hub 13 of the forming roller presents shoulders 27 which limit the forming depth of the rib.

In carrying out the method, the juncture of the shoulders 27 with the rib 14 is rounded on each side of the rib at 28 and the rib 14 extends from the rounded portions 28 with slightly convergent sides 29 and the free end of the rib 30 is slightly curved. Furthermore, the juncture of the end of the rib 30 with the side walls 29 is also curved, as at 31.

It is well known that the galvanize coating will yield or stretch to a slight extent without breakage and advantage of that fact is taken in the carrying out of the present method, for it will be noted that as the rib 14 enters the material of the coupling, the contact with the coating 26 is on a somewhat rounded plane and as the rib forces its way into the material, this rounded cooperation of the portions of the rib and shoulders which contact with the coating avoids any possibility of breaking the coating.

In other words, by the method described, the coating is forced with the material of the coupling to form the annular interlocking depression and at every point where the angular relation of the coating with respect to its normal plane surface is changed, there is a rounded surface over which the coating is in effect stretched and which, under any and every circumstance of operation, is prevented from breaking. This is clearly illustrated in Figure 6 from which it will be seen that the galvanize coating 26 is, by the method described, maintained in unbroken condition throughout the full surface of the annular depression 23.

This method of forming the annular depression is, therefore, unique in that it maintains the protective coating or galvanize layer unbroken for the full exterior surface of the coupling including the sides and bottom of the annular depression. This permits the use of the interlocking means described to secure a complete interlocking and sealing of the coupling and conduit sections without breaking the protective galvanize coating at any point. Therefore, the coupling on its exterior surface is fully and completely protected against deterioration by the galvanize coating throughout its full area.

As the depression 25 formed in the conduit sections must necessarily follow the contour of the depression 23 in the coupling 20, it follows as a matter of course that the formation of this depression 25 in the conduit sections will also avoid any possibility of a break in the galvanize coating of such conduit sections and, therefore, the conduit sections as well as the coupling will remain completely protected by the galvanize coatings during and after the completion of the interlocking formation.

The method constitutes the distinction between success and failure of interlocking means for couplings of this character. Where, as has heretofore been proposed, the interlocking action necessarily tends to a breakage in the galvanize coating, there follows immediately the exposure of the metal of the parts to moisture and the elements with a correspondingly rapid deterioration of the parts at the coupling section and this is particularly pronounced and rapid where, as in a large number of instances, the unit is embedded in cement or the like by which act an unusual amount of moisture is directly applied to the unit.

The very life and service of the unit depends in a very large measure on this protective feature resulting from the method employed. Without it the connecting unit rapidly deteriorates, moisture is admitted to the metal proper which rapidly rusts through and the contained wires, where the unit is used for this purpose, are more or less rapidly short-circuited. If the conduit as a whole is embedded in concrete which has set, the difficulty and expense of replacing the parts is, of course, apparent.

By the method described, the entire conduit, and particularly the coupling area, is just as effectively protected after the coupling as is any other part of the conduit and therefore the coupling under the described method and means is interlocked and sealed and effectively protected throughout the full interlock and seal by the normal galvanize coating of the parts with its obvious material increase in the life and effectiveness of the unit.

The improvement is shown as applied to a box connector for use in this type of electrical conduit service, such construction being clearly shown in Figure 7 of the drawing. The box connector is made of an oversize conduit section 35 formed with an outstanding rib 36 to limit the application of the connector to the box and threaded at 37 to permit the application of the securing nut on the inner side of the box. The conduit section, here indicated at 38, is inserted in the end of the box connector opposite the threaded end and the tool applied in the manner already described to form the depression 39 in the box connector and in the conduit section.

It is, of course, to be understood that the tool is available and practicable for any size of conduit used in normal construction. It is of importance to note that in addition to the sealing fit the improvement provides a connection of great tensile strength forming in effect a perfect interlock resisting separation under a pull materially in excess of that to which the conduit would ever be subjected in use. Furthermore, with the sections connected in the manner described, there is provided a continuous solid pipe or conduit which materially increases the life of the installation and one in which there is little possibility of a break or leak.

While the construction has been described in connection with a conduit designed for the connection of electrical wires and the like, it is of course to be understood that neither the method nor apparatus is to be restricted to this use, for such method and apparatus may effectively serve for interlocking and sealing the meeting ends of pipes or the like designed, for example, for the passage of water or other fluid, under which circumstances it is more important for the use of the method described as in such instances the conduit as a whole is subjected at all times to the action of water or the like from within.

What is claimed to be new is:

1. A method of interlocking and sealing the meeting ends of conduit sections, wherein a coupling unit is employed to overlie and project beyond the meeting ends of the sections, and wherein the sections and coupling are protected by an exterior galvanize layer, said method consisting in forming through the medium of relatively rounded surfaces an annular depression in the surface of the coupling and forcing the material displaced by the depression into the surface of the underlying conduit sections through the use of a plurality of forming elements, the formation of the depression in the coupling being initially resultant from the use of a single forming element operated under relatively slight pressure to form a defined channel of such relatively slight depth that in the formation the galvanize layer is stretched throughout the depression and without breakage and then increasing the pressure to utilize two additional forming elements operating in said channel to cooperate in further stretching without breakage the galvanize layer and continuing the pressure on all forming elements until the requisite depth of depression is provided under such gradual stretching of the galvanize layer that in the completed depression the galvanize layer remains intact and avoids exposure of the metal underlying the coating at any point in said formation, the axes of the two additional forming elements being on lines parallel to the diameter of the tube on which they operate.

2. A method of forming an interlock and seal for the meeting ends of conduit sections, with an interconnecting overlying coupling and with the surfaces of the sections and coupling having a galvanize coating, consisting in applying to the coupling an element having a plurality of depressing-forming elements, one of which is of relatively increased diameter, applying pressure to the elements sufficient to cause one element of relatively decreased diameter to initially form a defined channel of materially reduced depth as compared with the ultimate depression, the formation of the channel serving to slightly stretch the material of the galvanize coating over the surface of the channel without breakage in said coating, then increasing the pressure to cause the element of relatively increased diameter and the remaining element of relatively reduced diameter to engage in the channel and under the increased pressure gradually increase the depth of the channel to gradually increase the stretching of the galvanize coating without breaking, and gradually increasing the pressure until all elements operate to form a depression of the required depth with a continuous increase of stretch in the coating without breakage.

3. A method of interlocking tubular sections and a coupling unit with their outer surfaces galvanized and without breaking or interrupting such galvanize coating, consisting in applying to the coupling over the sections a plurality of elements and causing the elements to travel in a predetermined path around the coupling, one of the elements being of greater diameter than the others and the initial pressure of application being such as to cause one element of relatively reduced diameter to alone form in the coupling a shallow channel and a consequent slight stretching of the galvanize coating without breakage therein, then increasing the pressure until the remaining element of relatively reduced diameter and the element of relatively increased diameter cooperate with the channel to further increase the depth of the channel the element of relatively increased diameter completing the channel to the final depth whereby to increase a gradual stretching of the galvanize coating without breakage until the final depth of depression is provided, the gradual forming depth of the depression insuring a gradual stretching of the coating to cause the coating to finally cover the full surface of the depression while integral with the coating on the surface of the coupling.

JAMES N. ICE.